US006738760B1

(12) United States Patent
Krachman

(10) Patent No.: US 6,738,760 B1
(45) Date of Patent: May 18, 2004

(54) METHOD AND SYSTEM FOR PROVIDING ELECTRONIC DISCOVERY ON COMPUTER DATABASES AND ARCHIVES USING ARTIFICIAL INTELLIGENCE TO RECOVER LEGALLY RELEVANT DATA

(76) Inventor: Albert Krachman, 412 E. Columbia St., Falls Church, VA (US) 22046

( * ) Notice: Subject to any disclaimer, the term of this patent is extended or adjusted under 35 U.S.C. 154(b) by 246 days.

(21) Appl. No.: 09/634,791

(22) Filed: Aug. 9, 2000

Related U.S. Application Data

(60) Provisional application No. 60/192,614, filed on Mar. 23, 2000.

(51) Int. Cl.[7] .............................................. G06F 17/30
(52) U.S. Cl. ...................... 707/3; 707/4; 707/6; 707/9; 707/10
(58) Field of Search ........................................ 707/1–10

(56) References Cited

U.S. PATENT DOCUMENTS

| | | | |
|---|---|---|---|
| 3,548,385 A | | 12/1970 | Tunis ....................... 340/172.5 |
| 5,159,180 A | | 10/1992 | Feiler ........................... 235/375 |
| 5,444,615 A | | 8/1995 | Bennett et al. .............. 364/401 |
| 5,576,954 A | * | 11/1996 | Driscoll ........................... 704/9 |
| 5,819,248 A | | 10/1998 | Kegan .......................... 706/45 |
| 5,875,431 A | | 2/1999 | Heckman et al. ............... 705/7 |
| 5,940,800 A | * | 8/1999 | Bennett et al. ................ 705/1 |
| 6,028,601 A | * | 2/2000 | Machiraju et al. ........... 345/705 |
| 6,289,342 B1 | * | 9/2001 | Lawrence et al. .......... 707/102 |
| 6,366,925 B1 | * | 4/2002 | Meltzer et al. ................ 705/1 |

FOREIGN PATENT DOCUMENTS

| | | | | |
|---|---|---|---|---|
| WO | WO 97/12334 | * | 3/1997 | ........... G06F/17/30 |

OTHER PUBLICATIONS

Rose et al, Legal Information Retrieval: A Hybrid Approach, ACM, May 1989, pp. 138–146.*
Schweighofer et al, A Learning Technique for Legal Document Analysis, ACM 1999, pp. 156–163.*
Electronic Evidence Discover, Inc. Electronic Evidence Discovery, 1998, 8 pages, http://eedinc.com.
Internet Ontrack, Dec. 18, 2000, 2 pages.http://ontrackevidnece.com/electronic discovery/.

* cited by examiner

*Primary Examiner*—Greta Robinson
*Assistant Examiner*—Debbie M. Le
(74) *Attorney, Agent, or Firm*—Roberts Abokhair & Mardula, LLC

(57) ABSTRACT

A method for providing electronic discovery on computer systems and archives is provided by using artificial intelligence to produce smart search agents to retrieve relevant data, particularly legally relevant documents. Information relevant to desired data related to an issue is input into a neural network to train said neural network to produce search algorithms in the form of smart search agent. The smart search agents are released onto target computer systems and/or archives to search for responsive data and documents. Notification, reports, and indexing of responsive data and documents can be provided to produce relevant results or prevent the production of relevant results.

17 Claims, 13 Drawing Sheets

Fig. 11

AI-Litigator (110)

- Query (111): "Note fal the city"
- [Query] button (113)
- Pre-Formatte Queries,
- Number of results to return
- Minimum threshold of results; database selection(s) (115)
  - ☒ Caldwell
  - ☐ Flee

AI-Litigator Document (114)

CITY OF CLIFTON FORGE
CITY OF CLIFTON FORGE
547 MAIN STREET P.O. BOX 631
547 MAIN STREET P.O. BOX 631
CLIFTON FORGE, VIRGINIA 24422
(540)863-2500/2501    FAX (540) 863-2538

April 21, 1998

Computer Center Software
Attn: John Marr, Jr.
370 U.S. Rt. 1
Falmouth Maine
(F) 207-781-3585

Ref E-Mail 4-10-98

Dear John

We are in receipt of your memo of 4-10-98. I have reviewed in detail all your suggestion of an interface between Mums and Briter This question was posed to our auditors, Robinson, Farmer and Cox and after considerable discussion., the auditors did not recommend this solution In our FP process, the City of Clifton Forge clearly requested a fully developed software system that would meet all the requirements in Virginia. At that time, the other software vendor under consideration was already meeting all VA reporting requirements. The selection of Munis (CCS) was predicated on your guarantee to also meet all VA reporting requirements but in 12-15 months. We made our selection on CCS's promise to deliver a fully integrated turn key software program to meet both City's needs and the State's requirements.

18%

CITY OF CLIFTON FORGE 547 MAIN STREET P.O. (116)
CITY OF CLIFTON FORGE 547 MAIN STREET P.O.BOX 631 CLIFTON FORGE,VIRGINIA 24422 (540) 863-2500/2501 FAX (540)863-2538 April 21 1998 Computer Center Software Attn: John Marr Jr.

[Original Document]  [Plan Text]

112

AI-Litigator

Made false or inaccurate statements which induced the city to purchase

☑ Show Short summary

[Query] [Help] [Reset Query Form]

PreFormatted Queries: Made false or inaccurate statements ▼ — 133
Number of results to return: 25 ▼
Minimum threshold of results: 10 ▼ %
Database selection(s):
☑ Caldwell
☐ Fleet
☐ JonesDay
☐ LawDictionary (Home)

AI-Litigator Summary

In our RFP process, the City of Clifton Forge clearly requested a fully developed software system that would meet all the requirement n Virginia CCs should have made the effort to understand the VA Tax system before marketing the software to address Clifton Forge requirements..........Computer Center Software Page 2 April 21, 1996 Clifton Forge made a good faith purchase of CCS,s software based upon the our understanding that CCS would have a complete VA package on or before August 1998. CCS should not market what it could not produce and leave Clifton Forge with a partial solution but paying for a complete package.

[Done]

Similar Document(s)

| | Weight | Title |
|---|---|---|
| | 50 % | April 29, 1998 Mr. Richard Magnifico [Original Document] [ Plain Text] City of Clifton Forge Manager 547 |
| ☐ | 18 % | CITY OF CLIFTON FORGE 547 MAIN STREET - P.O. [Original Document] [Plain Text] CITY OF CLIFTON FORGE 547 MAIN STREET - P.O. BOX 631 CLIFTON FORGE, VIRGINIA 2442 (540) 863-2500 / 2501 - FAX (540) 863-2538 April 21, 1998 Coumputer Center Software Attn. John Marr Jr. |
| ☐ | 18 % | AMENDMENT TO AN AGREEMENT BETWEEN COMPUTER CENTER SOFTWARE [Original Document] [Plain Text] AND CITY OF CLIFTON in return for his deposit, the Seller will provide Buyer a tape of the software a applications listed in Exhibit 1 to be held by Buyer unit |

Fig. 13

METHOD AND SYSTEM FOR PROVIDING ELECTRONIC DISCOVERY ON COMPUTER DATABASES AND ARCHIVES USING ARTIFICIAL INTELLIGENCE TO RECOVER LEGALLY RELEVANT DATA

RELATED APPLICATIONS

This application claims the benefit of U.S. Provisional Application No. 60/192,614, filed Mar. 23, 2000.

FIELD OF THE INVENTION

The present invention is drawn to a method and system for providing electronic discovery on computer databases and archives using Artificial Intelligence (AI). More particularly, the present invention uses AI search technology to apply sophisticated algorithms and probabilities to search computer databases and archives for data most relevant to legal activity such as litigation, regulatory proceedings, regulatory compliance, mergers & acquisitions, due diligence inquiries, Freedom of Information Act (FOIA) requests, and criminal law enforcement.

BACKGROUND INFORMATION

Businesses today maintain massive volumes of electronic and paper data. In dispute resolution, parties are often called on to sift through and produce relevant data, a process that is extremely labor-intensive and expensive.

For example, discovery requests during litigation can cause various problems for the parties with respect to hard copies, computer databases, and archives. For the party making discovery requests, the primary problems are (i) the enormous amount of data to be sifted through resulting from broad discovery requests and (ii) the failure to discover broadly distributed information resulting from narrow discovery requests. For parties responding to discovery requests, the primary problems are (i) the enormous amounts of data which must be kept and/or turned over as a result of the litigation and (ii) the unintended production of new discoverable material.

Problems can also arise before a complaint is filed. As soon as one-party knows there is a potential dispute, they will want to search their own side to assess risk and find evidence of problematic documents. They will also want to send a document preservation letter to the other side early in the process.

Once a complaint is filed, the litigant is under a duty to preserve what it knows, or reasonably should know, is relevant in the action, is reasonably calculated to lead to the discovery of admissible evidence, is reasonably likely to be requested during discovery, and/or is the subject of a pending request. *Williams v. GNC*, 593 F. Supp. 1443 (C.D. Calif, 1984)

On the response side, is now fairly clear that automatic electronic document destruction cannot continue after the responding company receives discovery requests, subpoenas or other similar legal process. On the other hand, the company does not want full-scale disruption of its data retention policy.

Beyond the management of old archival documents, a substantial problem exists in the area of newly created data. Once litigation is filed, does every e-mail created after the lawsuit become fair game? The Microsoft case seemed to indicate that the answer is yes. There is currently no software system that helps a company manage the creation of new, responsive and potentially embarrassing data.

Likewise, similar situations occur with respect to creation, maintenance, and recovery of information relevant to other activity, such as, but not limited to, legal issues like regulatory compliance (e.g., EEO, EPA, FTC, etc.), mergers & acquisitions (liabilities, indemnification, etc.), due diligence inquiries, Freedom of Information Act (FOIA) requests, and criminal law enforcement.

BRIEF SUMMARY OF THE INVENTION

The present invention is a system and method for searching and managing data relevant to legal activity using artificial intelligence technology applied to computer databases and archives or any form of electronic data storage. Although primarily described as it relates to computer databases and archives, the present system can also be used on hardcopy documents by scanning them into electronic form.

As used herein, the term "discovery" relates not only to discovery in litigation, but to data relevant to legal activities in general, such as, but not limited to, regulatory proceedings, regulatory compliance, mergers & acquisitions, due diligence inquiries, criminal law enforcement, and FOIA requests. As such, the terms "requesting parties" and "responding parties" are likewise meant to be broader than the litigation use of these terms. Additionally, the term "artificial intelligence" or "AI" refers to the simulation of human intelligence processes by computer systems. These processes include learning (the acquisition of information and rules for using the information), reasoning (using the rules to reach approximate or definite conclusions), and self-correction, as typically provided by a neural network that has been initially "trained" or fed large amounts of data and rules about data relationships.

Applying AI to discovery-related input parameters, requesting parties reviewing data on their systems or reviewing others data, can employ smart search agents or "bots" against data to search for and extract legally responsive data. The AI software can be plugged directly into the database targets or analyzed off-site through referenced copies. Likewise, responding parties can use the technology on their computer systems to access legal issues (such as liability or compliance), produce responsive data, fine-tune their document retention system, and manage the creation of any new responsive data.

It is an object of the invention to provide legally trained, AI-based electronic discovery on computer systems, databases and archives using artificial intelligence to produce legally relevant output against any data, either originally captured or translated into electronic form.

It is an object of the invention to provide electronic discovery on computer databases and archives using the AI-trained search agents.

It is therefore another object of the invention to automatically identify newly created relevant materials on computer systems and databases.

It is an object of the invention to provide AI-trained search agents to recognize legal terms and facts related to legal terms so that the most legally relevant documents and data are produced.

It is a further object of the invention to allow companies to fine-tune their data retention policy to conform to legal requirements and allow the business to safely proceed with some form of retention\destruction processes.

It is an object of the present invention to provide electronic discovery for the purpose of litigation, alternative dispute resolution, due diligence, regulatory compliance, legal risk management, and/or criminal law enforcement.

It is another object of the invention to operate a software program running in the background, using the AI concepts, that would alert general counsel or another insider that possibly relevant data has been created to allow for some measure of real-time handling, such as risk management.

BRIEF DESCRIPTION OF THE DRAWINGS

FIGS. 7–13 illustrate GUI screenshots of an exemplary embodiment of the present invention.

DETAILED DESCRIPTION OF THE INVENTION

Figure 1:
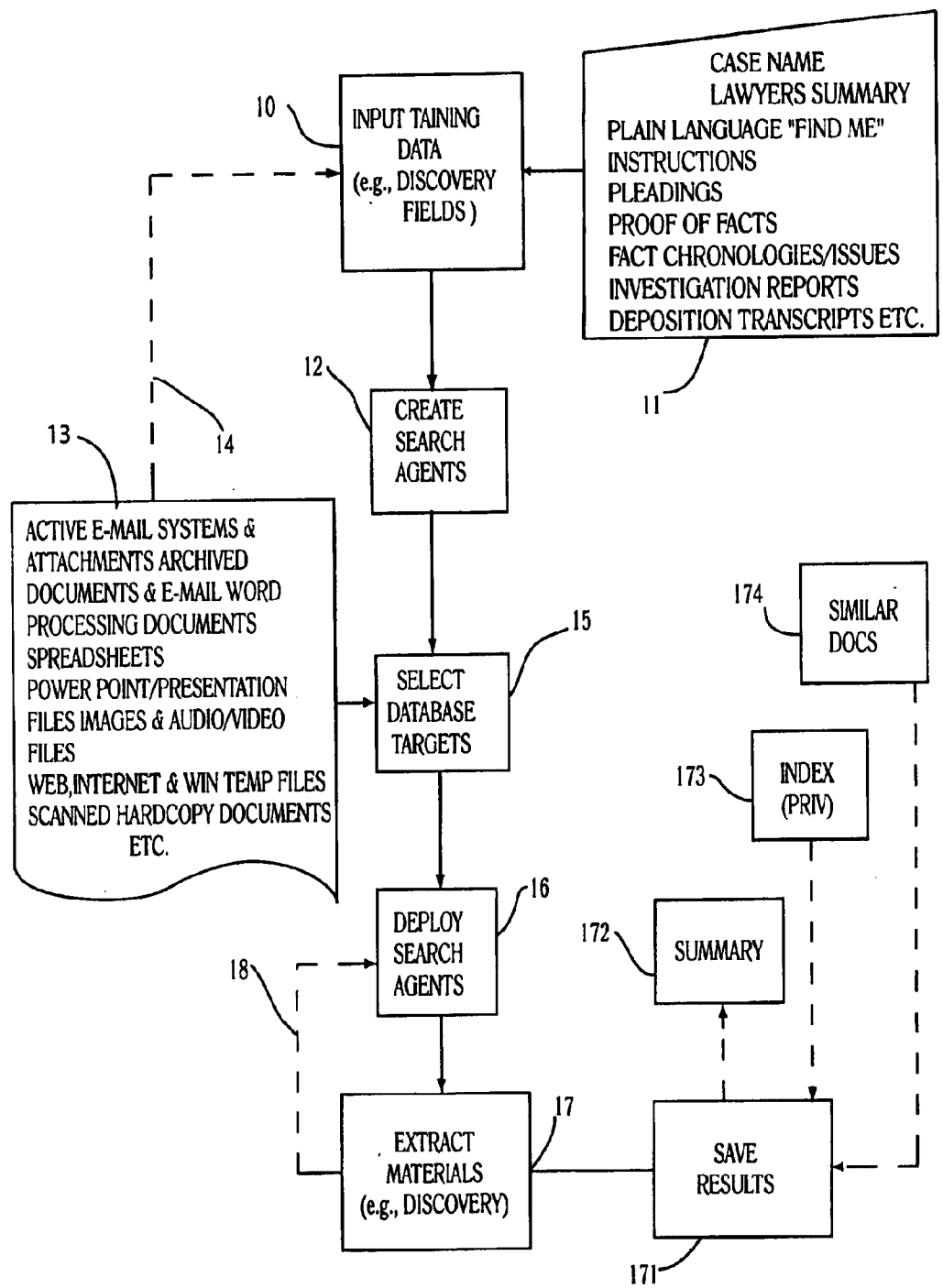
FIG. 1 discloses a basic flow chart of the present invention.

As shown in the flow chart of FIG. 1, the first step in implementing the present invention is to input 10 the appropriate data or fields 11 needed to create and train a neural network, such as the Dynamic Reasoning Engine (DRE) available from Autonomy, Inc. (301 Howard St., 22nd Floor, San Francisco, Calif. 94105) using AI. Alternate sources for AI search agent software are available from Hummingbird Ltd. of Toronto, Canada (Fulcrum KnowledgeServer) and Verity Inc. of Sunnyvale, Calif.

For example, in the case of litigation, fields 11 would typically include:

Case Name

Lawyers Summary

Plain Language "Find Me" Instructions

Voice Recognition Instructions

Pleadings (via Pleading Reader)

Proof of Facts

Total Am-Jur Series

Fact Chronologies/Issues

Investigation Reports

Deposition Transcripts

The neural network can also be linked to on-line legal services such as Westlaw or Lexis in order to input the latest information related to a legal issue.

In many cases, it will also be desirable to input the target databases 14 as part of the input for training the search agents.

A key feature of the present invention is the ability to feed key pleadings, discovery responses and other data, such as the target database, into an intelligent reader, and use standard or proprietary neural network/AI software to develop a search algorithm. In other words, an electronic query, such as a discovery request, would be formulated by the software and then converted to smart search agents 12 or "bots" by training of the neural network.

An intelligent reader can typically include a scanner and optical character recognition (OCR) software for paper documents, optical/magnetic media reader (for CD-ROM, DVD, floppy discs, etc.), a microphone and voice recognition software for voice input, and/or communication means operating with software/API/NI to accept input from online sources. Other input means, such as a keyboard, can be included for manual (i.e., "non-intelligent") input.

As previously mentioned, the database being searched can also be input 14 as part of the information used to create the search agents 12, as is presently done by the proprietary neural network/AI software available from Autonomy, Inc., although this is not required and meant as a limitation of the present invention.

The next step is to select the targets for the search 15, although this step may have to be performed earlier in order to determine the proper training data if input 14 above is used. Typical computer system targets 13 would include:

Active E-mail Systems and attachments

Archived Documents and E-mail WP Documents, Spreadsheets, Powerpoint/presentation files, images, audio/video files (e.g., mpeg, wav)

Web, Internet and Windows temp files

Scanned hardcopy documents

Other files

The smart search agents then run through the target 13 by being deployed 16 and extract responsive data 17. The search and extraction process can advantageously include iterative subset searching 18 in order to allow refinement of the search results from 17. Preferably, the results are saved 171. Output can include various forms, including, but not limited to, options to produce summaries 172, indexes 173 (such as for a privilege index), and similar documents 174, in addition to the documents themselves.

Figure 2:
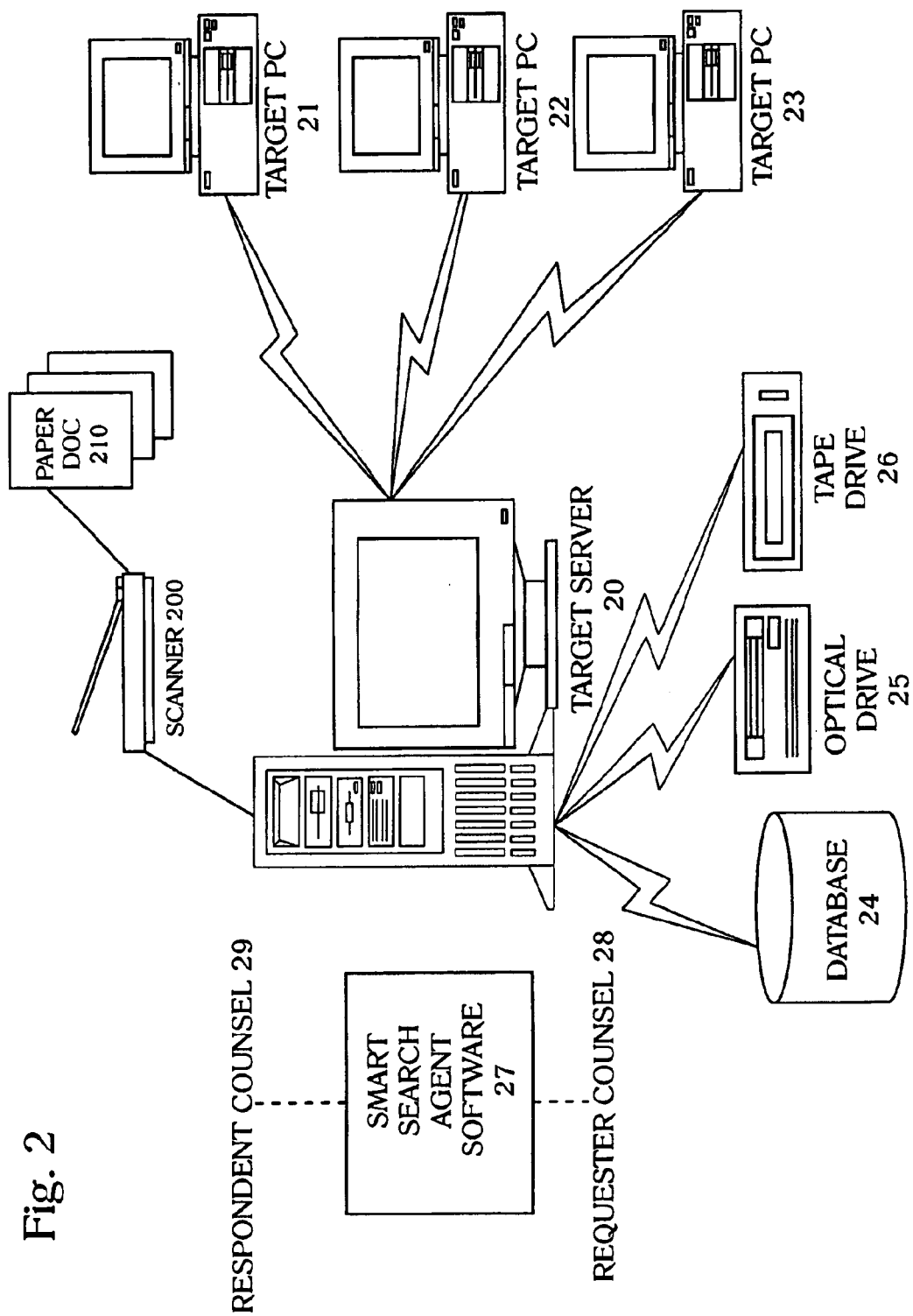
FIG. 2 discloses a typical diagram of the smart search agent deployment of the present invention on a respondent computer system.

As shown in FIG. 2, smart search agent software 27 of the present invention can be deployed on the target computer system 20–26 by either the requestor 28 (i.e., by court order) or the respondent 29. When loaded on the target server 20, the smart search agent can search for data on any networked databases 24, on the hard drives or RAM of target PC's 21, 22, 23, and on the target's archive systems such as tape drives 26 and optical drives 25. When responsive data is found, it is extracted and forwarded to the appropriate parties. Restoration procedures of archived data will usually need to be performed to enable the searching of the present invention.

As shown in the figure, a scanner 200, or other equivalent device, can be used to convert hardcopy (paper) documents 210 into electronic form for searching. This aspect of the invention enables enormous savings in manpower over methods traditionally used in the legal field.

Figure 3:
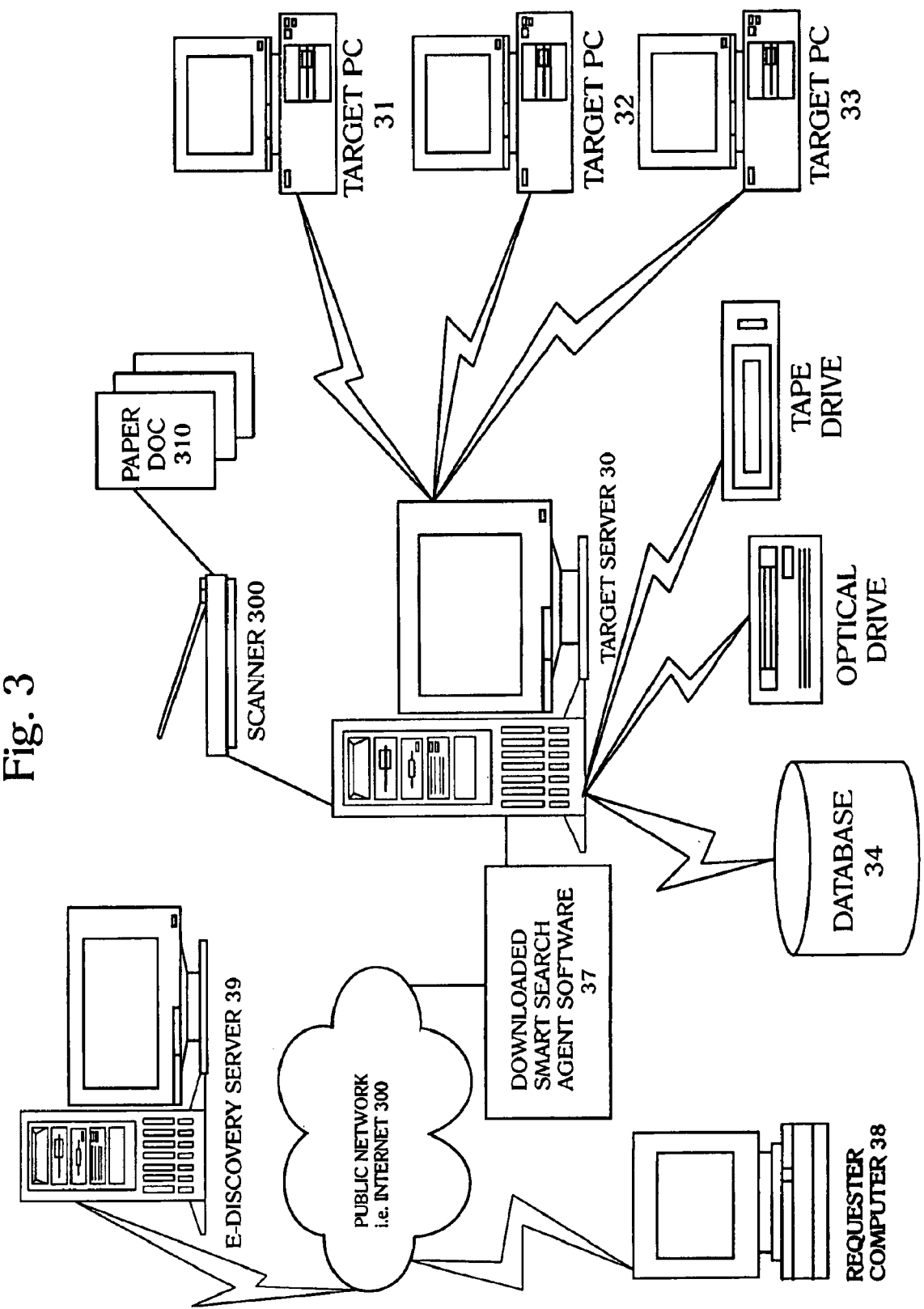
FIG. 3 discloses a typical diagram of a network-based deployment of smart search agent software of the present invention on a respondent computer system.

FIG. 3 illustrates a network-based system for employing the present invention, using like numerals corresponding to FIG. 2 for like components. In this system, either the requestor or the respondent can send input information to an electronic discovery server 39 containing the AI software for producing smart search agents. In certain cases, the electronic discovery server 39 can be controlled by a third party supervisory body which will obtain input from both parties in order to control the discovery process performed by the present invention.

In alternate embodiments, the AI software itself can be loaded or downloaded by either party onto their respective computers 30, 38 or accessed by either party via the network 300 (i.e., via a Java applet accessed by a browser over the Internet). They can then supply the input to produce their own "bots" to be employed by loading or downloading it onto the target computer system 30–36.

In a preferred embodiment, the present invention will include software to develop and deploy the AI based search agents to provide the following functional elements or tools:

Interceptor
Litigator
Responder
Diligencer

Interceptor

Figure 6:
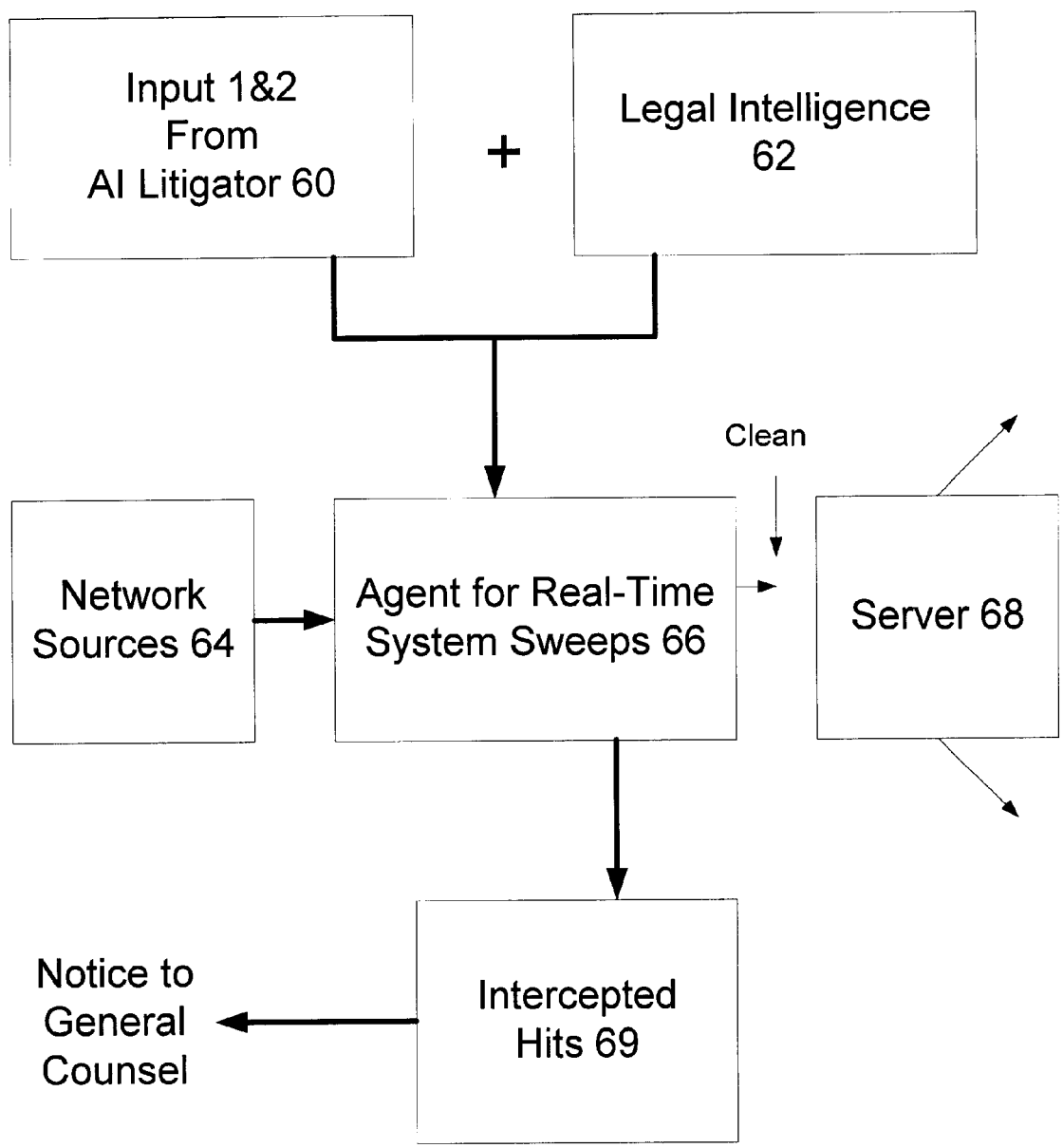
FIG. 6 illustrates a schematic diagram for the AI Interceptor tool of the present invention.

The spontaneous nature of e-mail makes it one of the most incriminating sources of evidence available. Damaging e-mail communications saved on networks are costing companies hundreds of thousands of dollars in liability, whether exposed in a contested proceeding, as part of a merger, or in a regulated environment. The e-mail interceptor tool, as shown in FIG. 6, uses the search agents 66 of the present invention to identify which communications from network sources 64 could expose the company to liability and then intercepts 69 problem communications before they are saved on the server 68 system, notifying the General Counsel, and providing the company options for maintaining the record or not. In this manner, the server 68 can be kept "clean" with respect to problem communications, allowing for a certain amount of risk management. Legal intelligence sources 62 and input 60 from natural text queries and claim/defense suggestors can be used to create the search agents 66. The interceptor may be employed for interrupting the message at the server before it gets distributed internally or sent out of the company.

Litigator

The litigator tool is a document production agent. It uses an AI search agent that "learns and understands" the content, context, and objective of the requester, and then applies this understanding to the electronic search of the target's electronic files. Going way beyond simple word searches or tags, this technology transcends traditional search methods, in effect allowing an "expert in a box" to search databases for concepts, with greater speed and accuracy than existing methods. Users of this technology will have a tremendous advantage in document intensive electronic discovery work. For litigation purposes, the software can feature automated privileged indexes, and automated production of motions to compel and/or protective order motions.

Responder

Labor burden associated with responding to information requests can be sharply alleviated with the responder tool. By inputting and training search agents with the data from a discovery request or compliance requirement, his technology allows the user to quickly and efficiently search its electronic files for responsive records at a fraction of the cost and a fraction of the time. Any organization which is obligated to produce copies of electronic files could realize thousands of dollars of savings through use of this functional element.

The responder tool is targeted at public bodies which must respond to FOIA or open records act requests. It is also very similar to the AI litigator tool, wherein the discovery requests are be plugged into a drop-down menu and electronic records searched.

Diligencer

As more and more data is captured in corporate records systems electronically without hard copy, due diligence for mergers, acquisitions, securities and environmental and other regulatory compliance becomes a hundred fold more complicated and labor intensive. The diligencer tool uses the search agents of the present invention to cut time expense dramatically from these processes and allows for high-speed, real-time document identification, retrieval and analysis. In this case, the current state of the law of due diligence can be input as part of the legal intelligence used to train the diligence search agent.

This diligencer tool comprises an AI based search system which is used in mergers and acquisitions and due diligence to check for problematic electronic documents in connection with an acquisition, such as evidence of sexual harassment in the target companies electronic systems. This type of data could affect the value paid to the company. In essence, the diligencer is very similar to the interceptor tool, except it is run all at once during the due diligence process.

Figure 4:
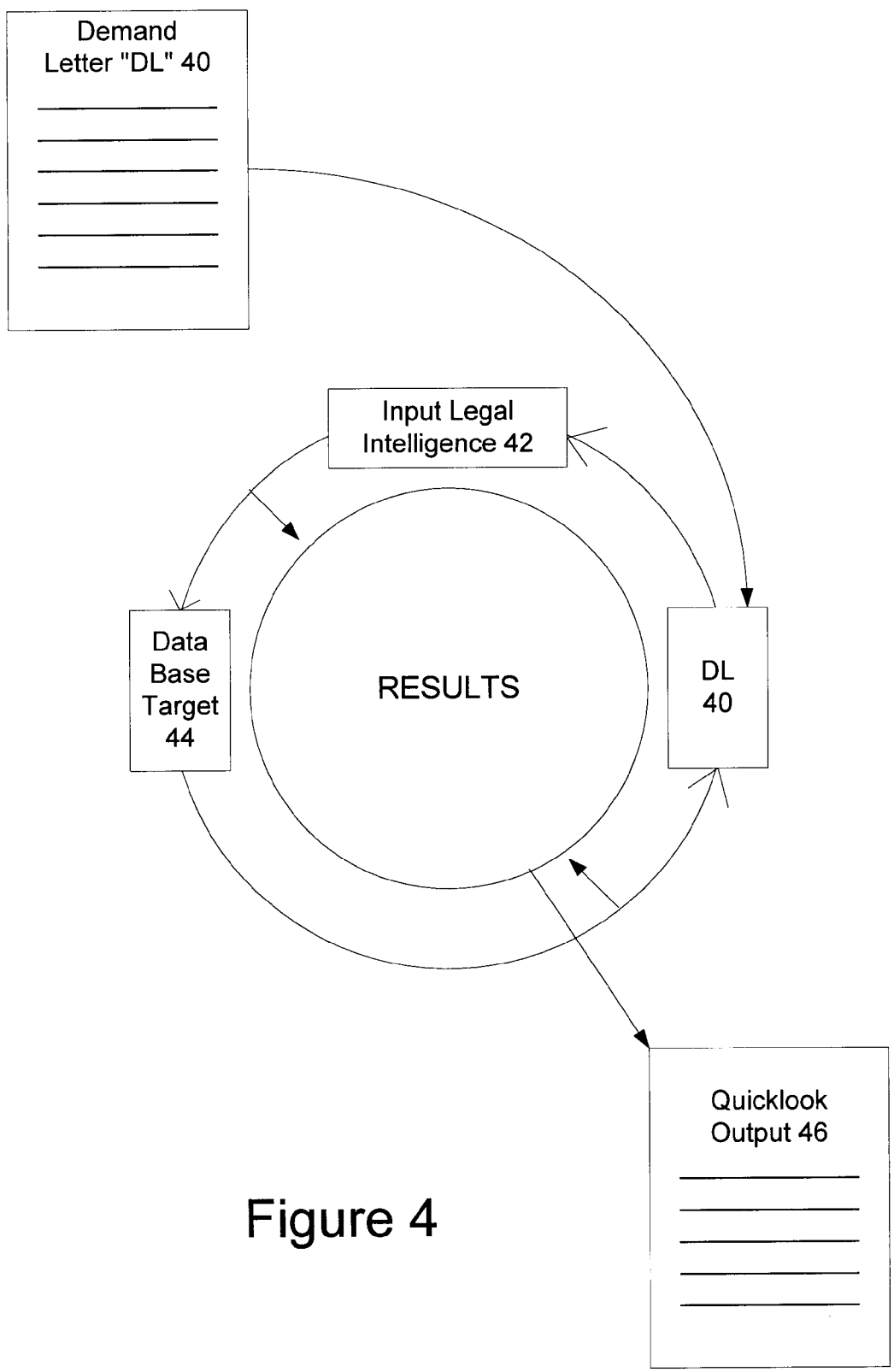
FIG. 4 illustrates a schematic diagram for the Quick Look tool of the present invention.

Other useful tools are available through the present invention. One is a quick look tool to enable counsel to rapidly access claims or demand letters. As shown in FIG. 4, an attorney receives a demand letter 40. The letter can be scanned in (e.g., OCR, etc.) and added to the legal intelligence 42 and information from the data base targets 44 as input for creating a quick look search agent to produce results that can then be reported in quick look output 46. As technology allows, a voice recognition input for counsel would be desirable for entering query text, as dictated.

Figure 5:
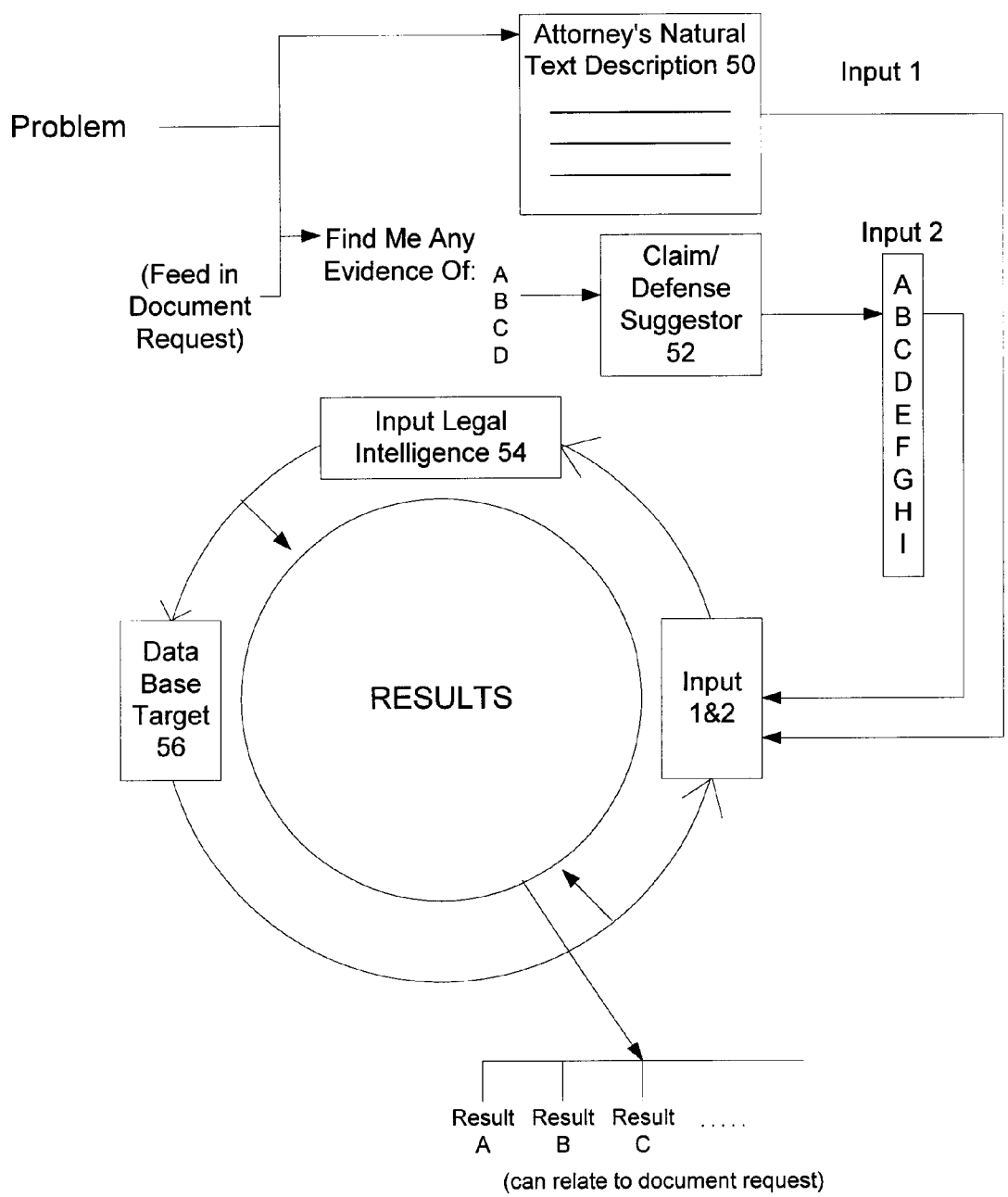
FIG. 5 illustrates a schematic diagram for the AI Litigator tool of the present invention.

Similarly, the litigator tool, as schematically shown in FIG. 5, can be used later for complete results. The attorney's natural language text description 50 (optionally dictated) of a problem can be combined with results from a claim/defense suggestor 52 to produce input for creating a litigation search agent. Numbered document requests can be used for input to the claim suggestor 52, and resulting output can be keyed to the numbered requests. As before, this input is added to legal intelligence 54 and information from data base targets 56 to produce the complete results (instead of a report).

In the litigation scenario, at the time the case is formulated, the present invention can also be used to assist in the generation of a data/document request that would be served prior to or concurrently with the complaint.

In any dispute resolution scenario, it can be used on a consensual basis against both parties systems. It is obvious that this will be a major battleground in discovery litigation, and a fair likelihood exists that a third party supervisory body will need to administer these discovery requests.

Additionally, the AI interceptor tool of the present invention can be used by counsel for real time notifications of documents which are sensitive to the company for any reason, such as indicators of sexual harassment problems, corporate compliance issues such as antitrust, securities problems and the like, as well as for new responsive documents related to previously identified issues. In this case, smart search agent or "bots," similar to those developed for searching previously existing documents, can run in the background and alert general counsel or another insider that possibly responsive data is being, has attempted to be, or has been created. This would work in real-time and allow for some measure of risk management.

An example of this use would be the employment of the AI interceptor tool for active e-mail or word processing filtering that "puts out the smoke" by including:

An evidence alert system that identifies a responsive document in real time, notifies and forwards it to the general counsel, and stops the document from being saved onto the PC or network Having a privileged notice sent to the document author A similar use for the AI interceptor tool could be integration with an Electronic Records Management system to flag potentially responsive (to litigation, regulatory issues, etc.) documents prior to destruction.

In operation of the present invention, verification and data integrity are critical. Due to the inherent susceptibility of computer data to subtle modification or alteration, challenges to admissibility and foundation issues are key problems in the litigation arena. The present invention can provide deep level information on the date of creation, author, modification dates and attributes which affect the integrity of the data. The data integrity information can appear as a stamp or bar code on recovered documents. The bar code data would then support (or undermine, when appropriate) the integrity of the data sought to be admitted during litigation or other proceeding.

The present invention can also be configured to produce different outputs depending on the version of the software purchased. One embodiment could simply print out the number of hits registered. For example, the output would show the responsive documents, the database the documents may reside in, the number of documents potentially privileged, and the number of documents potentially containing proprietary or confidential information which should be made subject to a protective order.

A second more complete embodiment could be configured to reprint all responsive documents, affix the integrity code, segregate the documents according to which document request they correspond, Bates stamp the documents, print out copies of all potentially privileged documents, and all potentially confidential, protective order documents. The program can also be configured to generate a draft privilege index.

One business model includes distribution of the versions of the software as part freeware, part shareware the web. The freeware version would generate the number of hits, etc. Users could then order the full version over the web by sending in a fee, then receiving via e-mail a code that would open the other capabilities.

Some exemplary uses of the system are illustrated below:

DEFENSIVE DOCUMENT INSPECTION OUTPUT

Responding to Document Requests

Special parameters input to correspond to numbered requests

Full text of responsive documents, indexed, with confidential or privileged status noted Draft privilege index Auto Redaction Ensure electronic document retention during/in anticipation of litigation Suggestions for Protective Order Motion—optionally tie in to Pleading and Practice Forms The present invention can also be used in a defensive capacity separate from or prior to any document request for risk management purposes or to produce exculpatory material.

OFFENSIVE DOCUMENT INSPECTION OUTPUT

Discovery Against Opponent

By court order, the system could be plugged into an opponent's existing databases to conduct the search or be used to review referenced copies of the electronic data at off-site location. After running the search agents for discovery against the opponent, essentially indexing the data through the system, results can be handled through appropriate GUI tools, as described below.

First generates index of potentially responsive documents, corresponding to numbered request, with coded, locked hyperlink to full text Both sides receive index: Respondent's counsel may electronically object or consents consent unlocks code Protected documents may be electronically redacted for partial release, released subject to protective order, or totally withheld on privilege grounds Optional plug-in generates Motion to Compel, with legal citation The present invention can also be used in an offensive capacity without a court order by searching, for example, the Internet to look for and produce relevant material that was not produced by your opponent.

PRIVATE E-DISCOVERY SERVICE

Used for Arbitrations, Court Referrals, etc.

Similar to Offensive Model but applies equally to both sides

Both sides agree to a discovery request

Generates index of potentially responsive documents, corresponding to numbered request, with coded, locked hyperlink to full text Both sides receive one another's index and counsel may electronically object or consent-consent unlocks code Protected documents may be electronically redacted for partial release, released subject to protective order, or totally withheld on privilege grounds A dispute index is created, counsel submits electronic statement of position/authorities to E-Discovery Mediation Service and binding or nonbinding decision on document release is generated Market this service to the AAA for use by and against both parties Make this and prior services available as an Application Service Provider (ASP)

The following hypothetical is useful for illustrating the use of the present invention.

Ms. Able is a long time Sales Manager of X Corp. X Corp. is about to do an IPO, and to bolster its numbers, hires a new VP for Sales, Mr. Doe. Ms. Able wanted the VP slot, but she sent an e-mail to a co-worker stating, I know Doe was more qualified, but I have more seniority."

Among other changes, Doe modifies the commission structure, effectively increasing the sales quotas. Ms. Able complained to the President about this, but the President was not receptive. Able discussed this also with her co-workers and sales reps, who were loyal to her. She starting thinking about starting her own firm.

At year's end there is a dispute with Ms. Able over her commission entitlement. Doe cannot come up with any formal written changes to Ms. Able's pre-existing commission structure. The rhetoric heats up and Ms. Able retains counsel. The demand from Ms. Able's counsel is 300% of any commission figure the company can calculate, and it also refers to a potential EEO claims for hostile work environment, failure to receive the position of VP of sales, and an unwanted sexual advance by a co-worker. The letter accuses the company of a pattern and practice of harassment, which it will take public, a veiled threat on the IPO.

Soon, information begins to get back to the company that Able has been talking to customers about her starting her own company. The company also hears rumors from competitors, etc. Able's sales have dropped dramatically, but there is real concern about avoiding a retaliation for the EEO charge. Negotiations are started with Able, but the Company receives an EEO investigative demand from the Federal EEOC, seeking all the company's employment and promotion records, etc. Able soon resigns but employees see her moving boxes of files out days before her resignation.

The company President walks into the office of the general counsel with the demand letter from Able's lawyer and the EEO Charge. Among the first things the general counsel wants to know it is what evidence of harassment exists. Are there any electronic (and hard copy) documents in the company's files which support the claim? He will also want information about the competing company Able was rumored to be starting, and information of the commission deal. Also, are current employees continuing to furnish her information?

Counsel will then consider potential counterclaims against Able, whether there are violations of any non-competition covenants in employment contracts, and what position to take on the commission issue. The lawyer will also consider any conduct of the employee might create breach of fiduciary duty claims, theft of corporate opportunities, and possible interference with contract in assertions.

Counsel therefore uses his desktop PC to access the present invention. He clicks on the an icon in his GUI and receives a login dialog box. After logging in, the login box includes a drop-down menu for existing cases, and an item for "Create New." He hits "Create New," and assigns a new matter name "Able."

Figure 7:
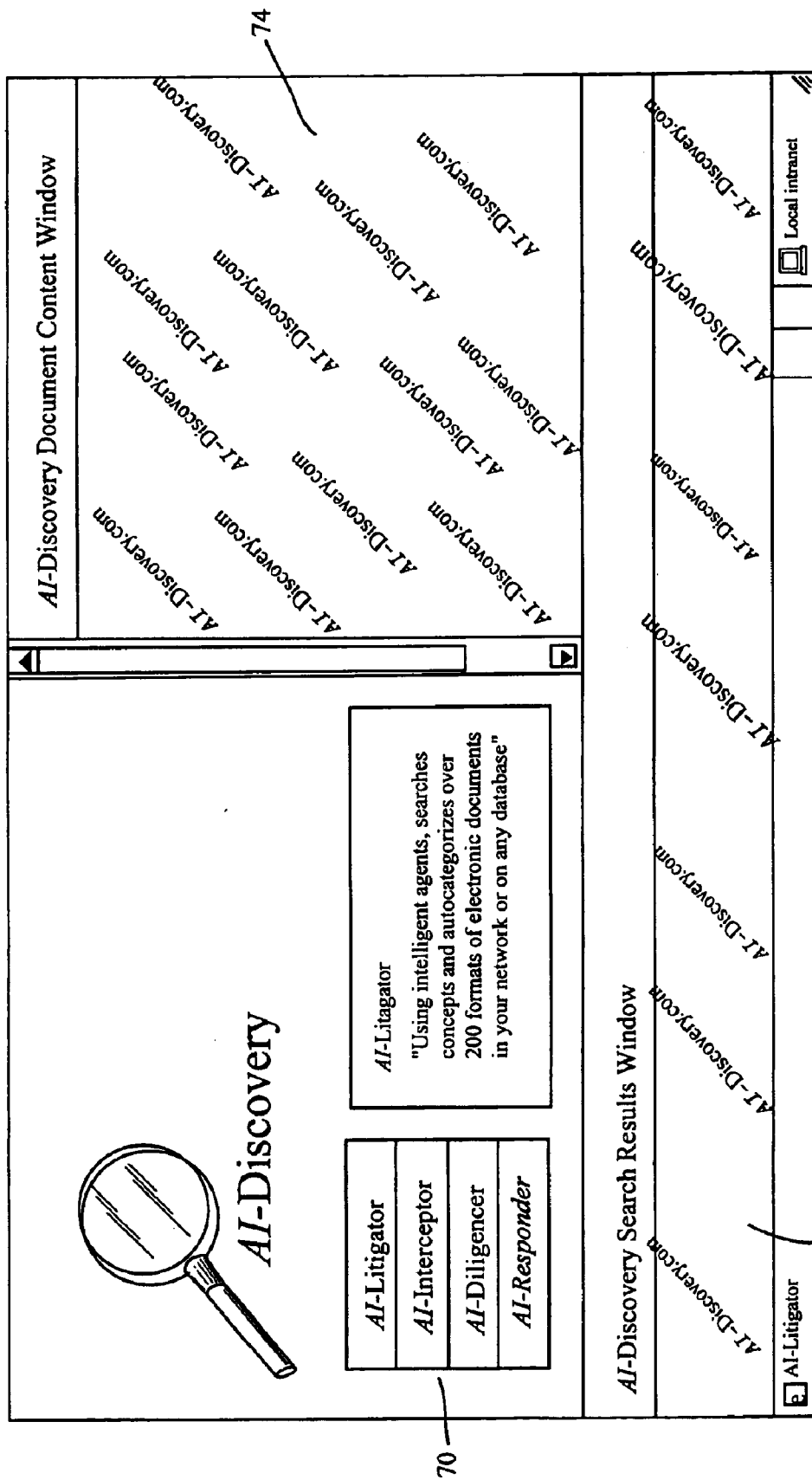

Once logged in, there will be toolbar or buttons 70 showing the various tools, called the AI Litigator, AI Interceptor, the AI Diligencer, and AI Responder, as shown in the screenshot of a GUI of FIG. 7 for this example. He clicks AI Litigator.

His first inclination is to do a "quick look" function which will involve scanning the demand letter into the system and running an initial search against recent e-mails in the server and on Able's local PC, and tapes. The purpose of the quick look test is to feed the information from the demand letter into the system of the present invention to allow a quick search of relevant documents. He might also want to train and unleash the AI Interceptor as soon as possible to catch internal communications between Able's former staff about this, and external communications to Able from inside the company.

Based on the output from the initial quick look search, or perhaps at a later point, the general counsel will quickly want to generate an evidence preservation letter to send to Able's counsel. The system will then automatically generate the evidence preservation letter, perhaps using some of the information from the quick look.

The general counsel will send the results of the quick look hit list into the newly formed Able file. He will come back to this a few days later when it is time to do some more in depth research.

When it is time to do more research, the general counsel will open up the Able file and a first dictate in a NaturalText case description. The case description will summarize the dispute. For example, the NaturalText description for this example could read:

"Employee Able has submitted an exhorbitant commission demand to the company, and claimed that if she is not paid, she will sue the company for sex harassment, EEO violations, failure to receive a promotion, breach of contract and other claims. We suspect that before her resignation, Able set up her own company, and has communicated with our customers, clients, subcontractors, and teaming partners about awarding her new business. We would like to reject the commission claim, and if the evidence suggests it, prepare a counterclaim suing her for breach of contract, breach of fiduciary duty, tortious interference with contract and whatever else we can find."

After creating the NaturalText box, counsel would like to do a more comprehensive search to look for evidence of the issues he recognizes off the top of his head, such as harassment, EEO, breach of contract, breach of fiduciary duty, etc., but he wants to know what other claims might be associated with these. He opens a a "Claim\Defense Suggestor." dialog box that will query him to look for evidence of specific subject areas in order to expand his listing.

He inputs into the Suggestor (1) the list of claims and defenses he came up with off the top of his head and (2) the Natural Text descriptions. The Suggestor then comes up with the following additional claims: breach of corporate opportunity, constructive trust, interference with prospective business advantages, and defamation. Also, it would generate a checklist of affirmative defenses, such as failure of consideration, fraud, other defenses.

A final list of 16 Evidence Queries is then generated. It will say: Would you like to look for evidence of:

1. EEO Violations; 2. Breach of Contract; 3. Breach of Fiduciary Duty 4. Defamation 5. Fraud . . . 6,7,8 . . . 16.

Counsel will hit "Select All" or discard one or more choices.

He would then want separate saved searches for each claim and defense. Counsel will click on the first claim, the EEO issue, and have search agents search for documents relating to Able's EEO claims. This will mean that the present invention will have to be trained on the law of EEO, and will need to "understand" what the indicia of an EEO claim are so the appropriate analysis can be applied to the database. For example, he would want the search agents of the present invention to turn up the document in electronic format drafted by Ms. Able to a friend that said, "I knew Doe was better qualified . . . ", i.e. the search agent would have to know (be legally smart) that job qualification was pertinent to an EEO claim. The same applies for every other claim and defense.

Further, he would also want it to find the document that said—"I think this IPO gives me great leverage . . . " based on the NaturalText and other input.

Optionally, the present invention could access a WebSite for the law of EEO, etc. At that point, that the general counsel would have a screen of hits and have a drop-down bar which would allow him to configure the screen to show up to four separate windows. One portion of the screen would be a drop-down list of the 12 claims he's decided to seek evidence on. Another portion would be the hit list results from particular search. The first item on that hit list will be displayed in the third portion of the screen in a format that showed 30–40 words around highlighted text illustrating the words the search agent found responsive to the query. That window can have several excerpted paragraphs from that first document, allowing counsel to instantly see what he is dealing with. The fourth portion shows the whole original document.

As counsel scrolls down the document hit list, the highlighted document and its segments appear in other portions of the screen. Other functions can include the automatic listing of other relevant documents, and a summarize function which can be used to generate a descriptive discovery log.

Using a drop-down from a view option in the tool bar or by dragging frame elements, counsel can configure the screen to view any combination of display portions.

If Autonomy, Inc.'s DRE is used, the portion showing the hits and the percentages can be very close to the native Autonomy window that would show be percentage weight of the document and would have the button for suggest similar documents. This could generate a sub hit list that could be viewed on any portion of the display. The program has the capacity to group the search results so that each larger group can be preserved and search against in the future for smaller sub searches.

The general counsel want to be sure that the search conducted using the search agents returned those that would be found on a key word search software platform and of course beyond. Using segments from the plain text hits-highlighted portions of documents, the system may also generate a proposed document request to Able, which seeks documents related to her claims, meetings, etc.

Optionally, the system can search American Law Reports, AmJur, Westlaw, or Lexis data bases for legal annotations on a subject matters of the claims. This would return a hit list of legal research topics that are most relevant to each of the allegations. By the end of the search session, the lawyer would have set up the present invention to comb through the files on each of the 16 affirmative claims, applicable affirmative defenses, and the next morning, these would be available in hit list form for initial review. A report is then generated, summarizing the results in e-mail to the general counsel that would say something to the fact there were 16 hits on EEO issue, 34 hits on breach of fiduciary duty, 500 hits on breach of contract.

Counsel then sends a response to Able's lawyer, attaching the incriminating e-mail and the claim and EEO charge is withdrawn in 5 days. During the process of this search, the inspection revealed three employees who communicated inside information to Ms. Able, and identified several potential sexual harassment e-mails which resulted in disciplinary action for certain employees.

Figure 8:
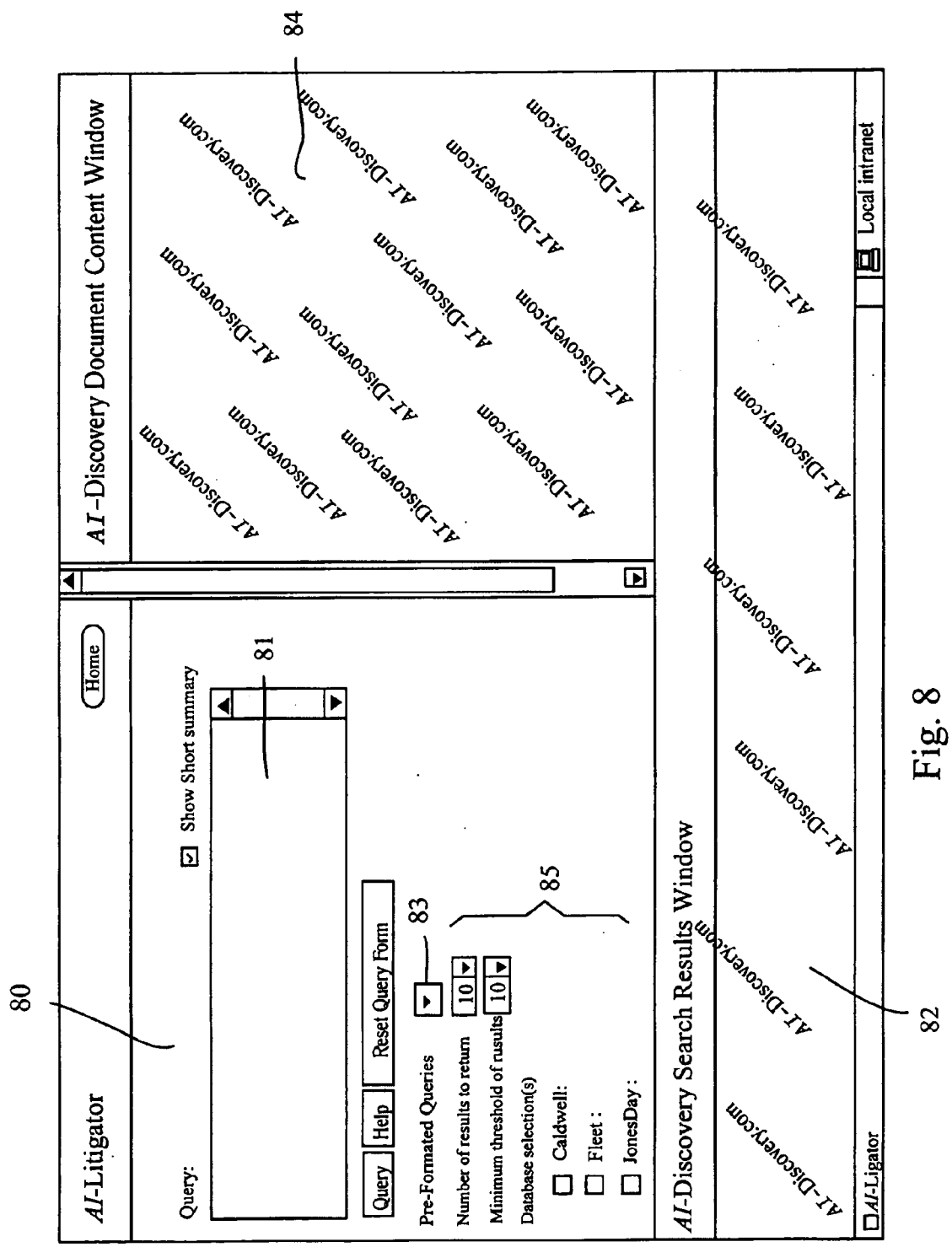
Figure 9:
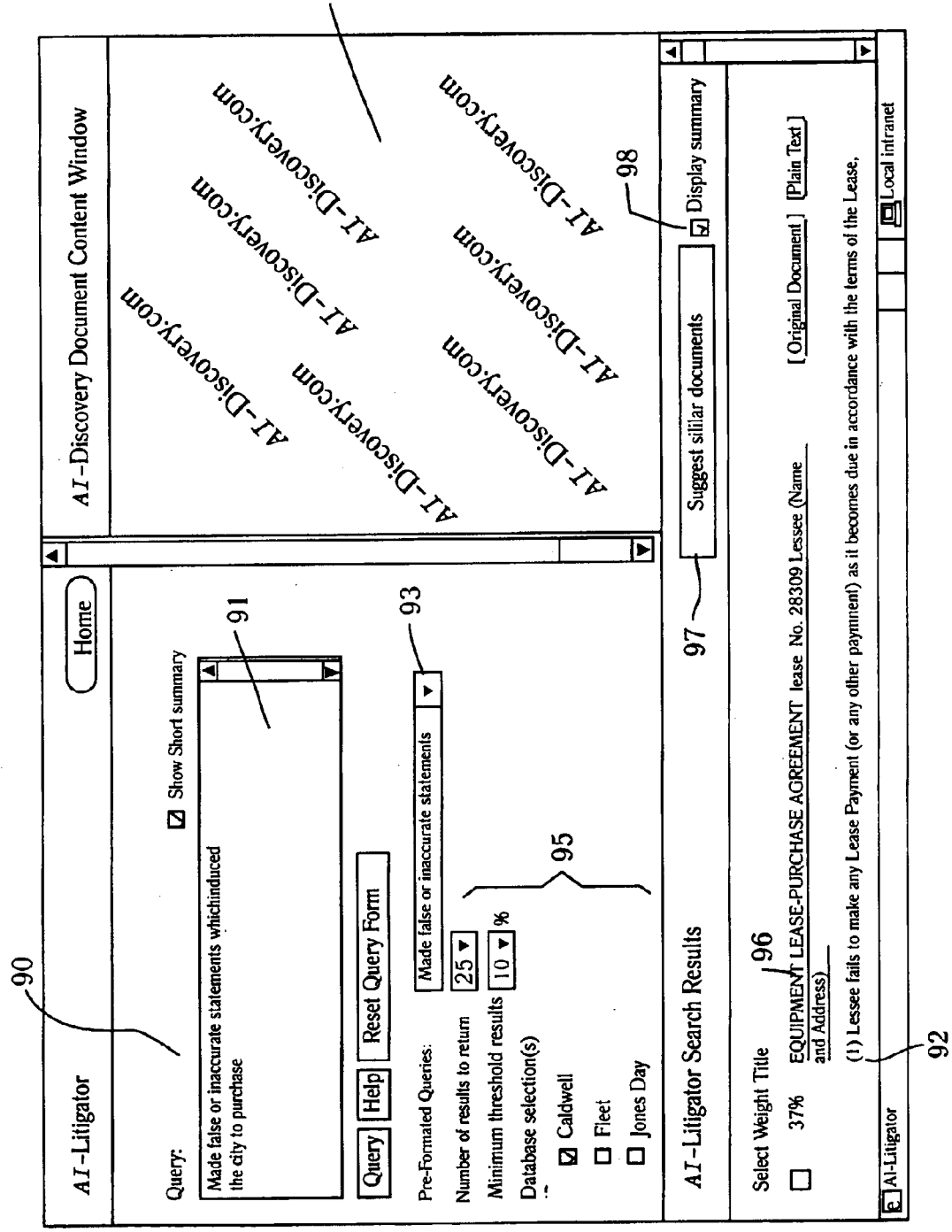

FIGS. 8–13 illustrate an exemplary embodiment of the GUI to practice aspects of the invention. FIG. 8 shows the AI litigator screen, having a query pane 80, a results window 82, and a document display window 84. As shown in FIG. 9, queries can be entered into a text box 91 or selected from a dropdown menu 93 in query pane 90, with target databases and output constraints being selected at 95. Links 96 of the search results are displayed in results window 92. A button 97 for suggesting similar documents and an option 98 to display summaries can be included.

Figure 10:
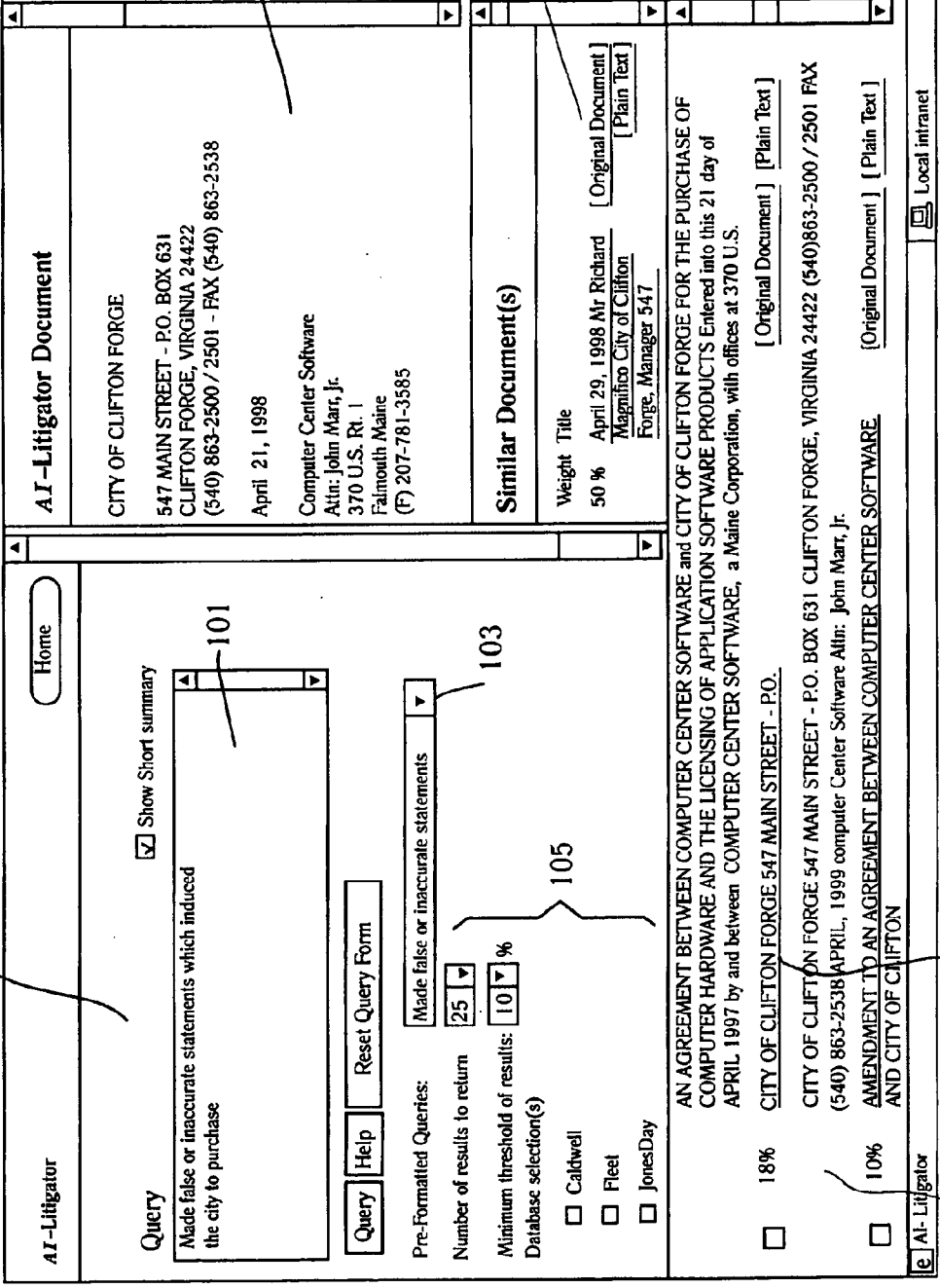
Figure 12:
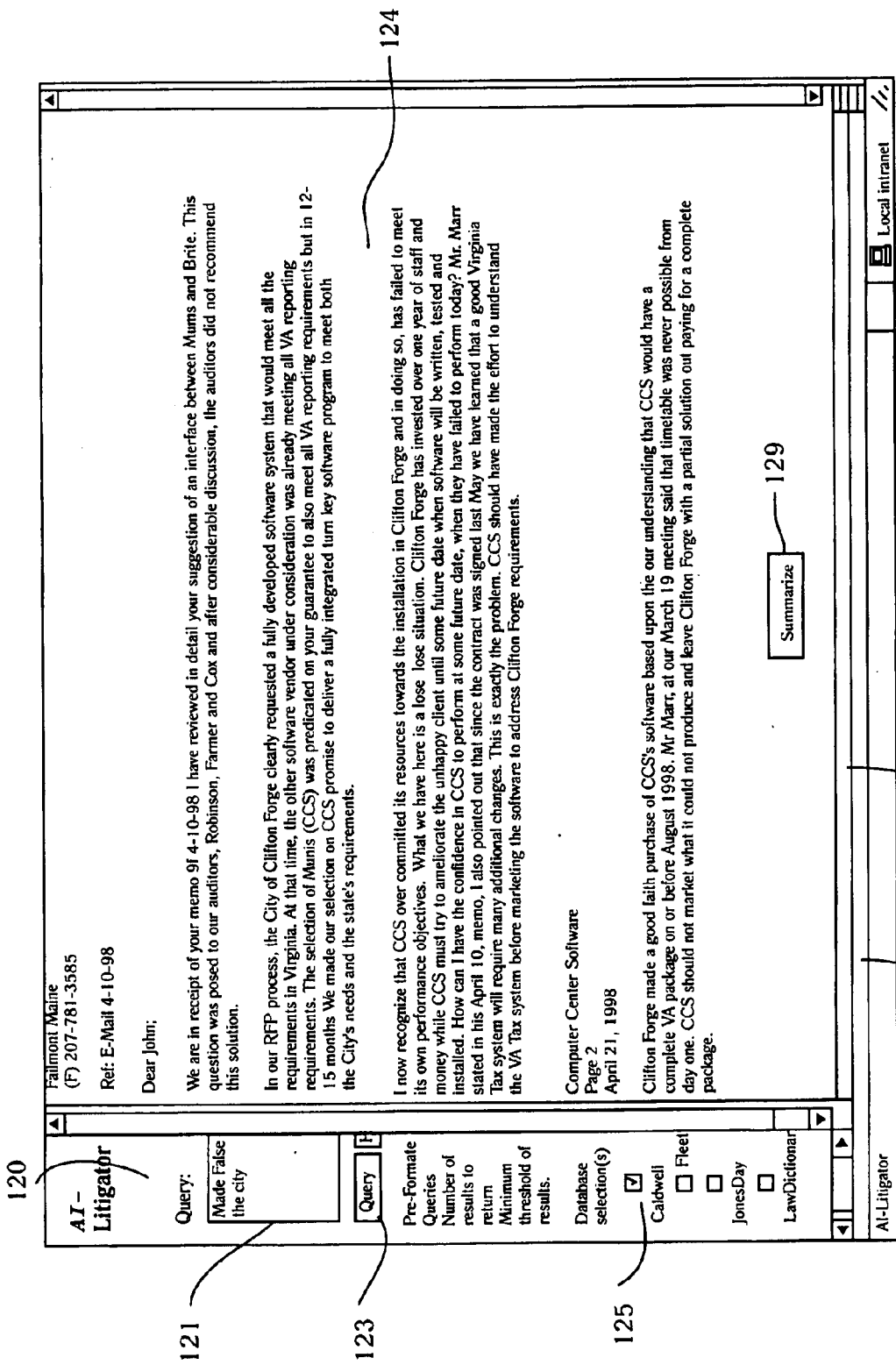

Upon selecting a result link and requesting similar documents, a similar documents window 107 is opened to display links to the similar documents and the selected result document is displayed in document display window 104, as shown in FIG. 10. Windows/panes can be resized for viewing purposes, as shown in FIG. 11. As illustrated in FIG. 12, the document display window 124 can include a button 129 to automatically provide a summary, as shown in document display summary window 134 in FIG. 13.

By employing Autonomy's DRE or similar neural network software, the present invention can use smart agents to sift through mountains of heterogeneous electronic information quickly and effectively. The trained smart agents can be used to extract text and other information from almost anything: they can burrow through e-mail systems such as Microsoft Exchange and Lotus Notes, word processing files such as Microsoft Word and Corel WordPerfect, electronic spreadsheets, news feeds, web pages, electronic databases, presentations, Adobe PDF files, etc. Numerous file formats and all ODBC-compliant databases, such as Access, Oracle, SQL Server, dBase, DB2, etc., can be searched by the present invention.

Although Autonomy's DRE has been mentioned as a source for helping create smart search agents, its use is not meant as a limitation and other neural network software can be employed. Additionally, the present invention has been disclosed with respect to data related to legal issues, but one of skill in the art would recognize that the invention can be applied to other valuable issue-related topics, such as corporate security, corporate research, and other consulting-type issues, and is therefore limited only by the claims appended hereto.

I claim:

1. A method for providing electronic discovery on computer databases and archives of a party subject to legal discovery using artificial intelligence to produce smart search agents to locate relevant discovery data comprising:
   inputting information relevant to desired discovery data related to a legal issue into a neural network;
   training said neural network to produce search algorithm in the form of a smart search agent;
   selecting target computer databases and archives of a party subject to discovery to search for responsive discovery data and documents;
   searching said computer databases and archives using said smart search agent;
   outputting discovery results comprising data and documents responsive to said searching.

2. The method for providing electronic discovery on computer databases and archives of claim 1, wherein said smart search agent sweeps network sources for computer systems associated with the computer databases to intercept and prevent the saving of certain data on the computer databases.

3. The method for providing electronic discovery on computer databases and archives of claim 1, wherein said results are indexed for review of possible confidential and/or privileged material.

4. The method for providing electronic discovery on computer databases and archives of claim 3, wherein said results can be locked or unlocked based on a determination of privilege.

5. The method for providing electronic discovery on computer databases and archives of claim 1, further comprising scanning paper documents into said computer database.

6. The method for providing electronic discovery on computer databases and archives of claim 1, further comprising inputting said target database as information relevant to desired discovery data for training said neural network.

7. The method for providing electronic discovery on computer databases and archives of claim 1, wherein said neural network is trained in legal concepts.

8. The method for providing electronic discovery on computer databases and archives of claim 1, wherein said discovery is for a purpose selected from the group consisting of litigation, alternative dispute resolution, due diligence, regulatory compliance, legal risk management, and criminal law enforcement.

9. A system for providing electronic discovery on computer databases and archives of a party subject to legal discovery using artificial intelligence to produce smart search agents, comprising:
   means for inputting information relevant to desired discovery data related to a legal issue into a neural network;

means for training said neural network to produce search algorithm in the form of a smart search agent;

means for searching selected target computer databases and archives of a party subject to discovery using said smart search agent;

means for outputting discovery results responsive to said means for searching.

10. The system for providing electronic discovery on computer databases and archives of claim 9, further comprising means for said smart search agent to sweep network sources for computer systems associated with the computer databases to intercept and prevent the saving of certain data on the computer databases.

11. The system for providing electronic discovery on computer databases and archives of claim 9, wherein said means for outputting discovery results indexes the results in a form capable of review of possible confidential and/or privileged material.

12. The method for providing electronic discovery on computer databases and archives of claim 11, wherein said form includes an ability to lock or unlock files.

13. A process of using artificial intelligence to enhance a legal party's response to corporate issues, comprising:

inputting appropriate data and/or fields related to said corporate issues into an artificial intelligence system;

developing a search algorithm using said artificial intelligence;

converting the search algorithm into a smart search agent;

deploying said smart search agent on said legal party's computer systems to identify electronic material relevant to said corporate issue; and indexing identified material for review of possible confidential and/or privileged material by the party.

14. The process of using artificial intelligence to enhance a party's response to corporate issues of claim 13, wherein said corporate issue is a legal issue selected from the group consisting of litigation, alternative dispute resolution, due diligence, regulatory compliance, legal risk management, and criminal law enforcement.

15. The process of using artificial intelligence to enhance a party's response to corporate issues of claim 13, wherein said identified material can be locked or unlocked.

16. A process of using artificial intelligence to enhance a legal party's response to corporate issues, comprising:

inputting appropriate data and/or fields related to said corporate issues into an artificial intelligence system;

developing a search algorithm using said artificial intelligence;

converting the search algorithm into a smart search agent;

deploying said smart search agent on said legal party's computer systems to identify electronic material relevant to said corporate issue and to intercept material at network sources to prevent copying onto said computer system's databases; and notifying said party of intercepted material.

17. The process of using artificial intelligence to enhance a party's response to corporate issues of claim 16, wherein said corporate issues are legal issues selected from the group consisting of litigation, alternative dispute resolution, due diligence, regulatory compliance, legal risk management, and criminal law enforcement.

* * * * *